United States Patent
Miyahara

(10) Patent No.: US 9,800,758 B2
(45) Date of Patent: Oct. 24, 2017

(54) IMAGE FORMING APPARATUS THAT AUTOMATICALLY CHANGES START TIME OF FEEDING PRINT MEDIUM IN RESPONSE TO STATE, AND RECORDING MEDIUM

(71) Applicant: Kyocera Document Solutions Inc., Osaka (JP)

(72) Inventor: Norifumi Miyahara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/086,071

(22) Filed: Mar. 31, 2016

(65) Prior Publication Data

US 2016/0295067 A1    Oct. 6, 2016

(30) Foreign Application Priority Data

Mar. 31, 2015   (JP) ................. 2015-072663

(51) Int. Cl.

| H04N 1/34 | (2006.01) |
|---|---|
| G06F 3/12 | (2006.01) |
| G07F 17/26 | (2006.01) |
| G06Q 30/04 | (2012.01) |
| G06K 15/00 | (2006.01) |
| G06K 15/02 | (2006.01) |

(Continued)

(52) U.S. Cl.
CPC ........... *H04N 1/342* (2013.01); *G06F 3/1296* (2013.01); *G06K 15/002* (2013.01); *G06K 15/1836* (2013.01); *G06Q 30/04* (2013.01); *G07F 17/266* (2013.01); *H04N 1/0032* (2013.01); *H04N 1/60* (2013.01); *H04N 2201/0094* (2013.01)

(58) Field of Classification Search
None
See application file for complete search history.

(56) References Cited

U.S. PATENT DOCUMENTS 5,455,603 A * 10/1995 Hori ................. G06K 15/16
                                                     346/134
6,064,838 A    5/2000 Maruta et al.
(Continued)

FOREIGN PATENT DOCUMENTS

| EP | 2296050 A2 | 3/2011 |
|---|---|---|
| JP | 2013-088773 A | 5/2013 |

*Primary Examiner* — Barbara Reinier
(74) *Attorney, Agent, or Firm* — James Judge

(57) ABSTRACT

An image forming apparatus includes a printer, a drawing data generating circuit, and a medium feeding circuit. The drawing data generating circuit generates, from print data, drawing data that causes the printer to execute a print job. The medium feeding circuit feeds the print medium to the printer. The medium feeding circuit executes: a first feeding stage in which the print medium moves to a specific position; and a second feeding stage in which the print medium moves from the specific position to the printer. The medium feeding circuit starts the first feeding stage after the drawing data is generated by the drawing data generating circuit when the image forming apparatus is in specific states, and starts the first feeding stage before the drawing data is generated by the drawing data generating circuit when the image forming apparatus is not in the specific states.

6 Claims, 6 Drawing Sheets

(51) Int. Cl.
*H04N 1/00* (2006.01)
*H04N 1/60* (2006.01)

(56) References Cited

U.S. PATENT DOCUMENTS

| | | | |
|---|---|---|---|
| 2003/0090705 A1* | 5/2003 | Ferlitsch | G06Q 20/403 358/1.15 |
| 2006/0061843 A1* | 3/2006 | Sadakuni | H04N 1/2166 358/523 |
| 2009/0015865 A1* | 1/2009 | Tao | G06F 3/1208 358/1.15 |

* cited by examiner

IMAGE FORMING APPARATUS THAT AUTOMATICALLY CHANGES START TIME OF FEEDING PRINT MEDIUM IN RESPONSE TO STATE, AND RECORDING MEDIUM

INCORPORATION BY REFERENCE

This application is based upon, and claims the benefit of priority from, corresponding Japanese Patent Application No. 2015-072663 filed in the Japan Patent Office on Mar. 31, 2015, the entire contents of which are incorporated herein by reference.

BACKGROUND

Unless otherwise indicated herein, the description in this section is not prior art to the claims in this application and is not admitted to be prior art by inclusion in this section.

There is known a typical image forming apparatus that includes: a printing unit that executes a print job on a print medium; a drawing data generating unit that generates, from print data, drawing data that causes the printing unit to execute a print job; and a medium feeding unit that feeds the print medium to the printing unit. The medium feeding unit executes a first feeding stage in which the print medium moves to a specific position, and a second feeding stage in which the print medium moves from the specific position to the printing unit.

SUMMARY

An image forming apparatus according to an aspect of the disclosure includes a printer, a drawing data generating circuit, and a medium feeding circuit. The printer executes a print job on a print medium. The drawing data generating circuit generates, from print data, drawing data that causes the printer to execute a print job. The medium feeding circuit feeds the print medium to the printer. The medium feeding circuit executes: a first feeding stage in which the print medium moves to a specific position; and a second feeding stage in which the print medium moves from the specific position to the printer. The medium feeding circuit starts the first feeding stage after the drawing data is generated by the drawing data generating circuit when the image forming apparatus is in specific states, and starts the first feeding stage before the drawing data is generated by the drawing data generating circuit when the image forming apparatus is not in the specific states.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
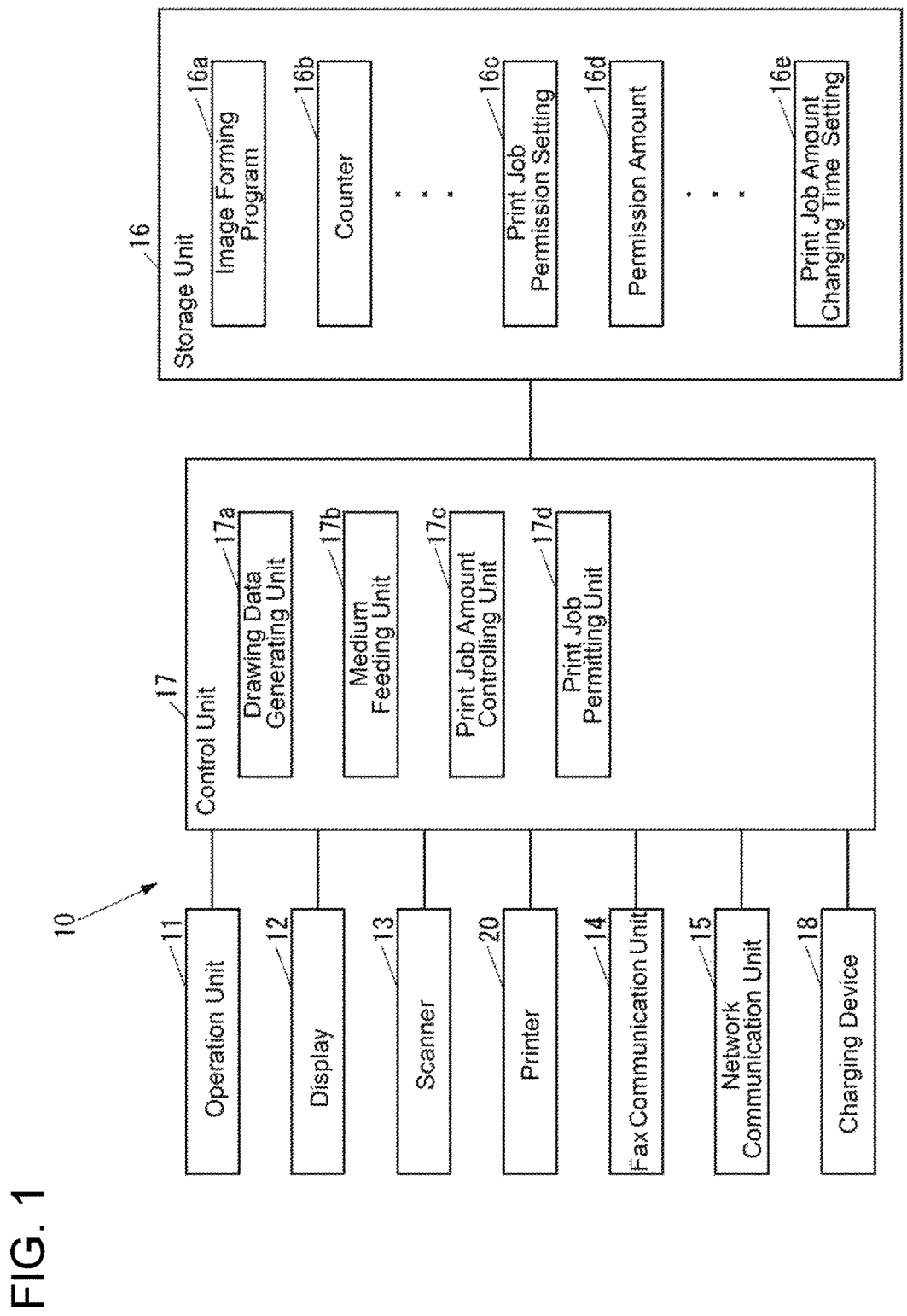
FIG. 1 illustrates an MFP according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

First, a description will be given of a configuration of a multifunction peripheral (MFP) as an image forming apparatus according to the embodiment. Note that an alphabet S attached before a numeral in a flowchart means a step.

FIG. 1 illustrates an MFP 10 according to the embodiment.

As illustrated in FIG. 1, the MFP 10 includes an operation unit 11, a display 12, a scanner 13, a printer 20, a fax communication unit 14, a network communication unit 15, a storage unit 16, and a control unit 17. The operation unit 11 is an input device such as a button for receiving various kinds of operations. The display 12 is a display device such as a liquid crystal display (LCD) that displays various kinds of information. The scanner 13 is a reading device that reads an image from an original document. The printer 20 is a print device that executes a print job on a print medium such as a paper sheet. The fax communication unit 14 is a fax device that performs fax communication with an external facsimile device via a communication line such as a dial-up line. The network communication unit 15 is a network communication device that communicates with an external device via a network such as a local area network (LAN) and the Internet. The storage unit 16 is a non-volatile storage device, such as an electrically erasable programmable read only memory (EEPROM) and a hard disk drive (HDD), which stores various kinds of information. The control unit 17 controls the whole MFP 10.

The MFP 10 may be equipped with a charging device 18 that executes a charging process for a print job. Examples of the charging device 18 include a coin vendor, which collects a charge such as coins for each print job, and a key counter, which can measure a print amount to collectively charge for several print jobs.

Figure 2:
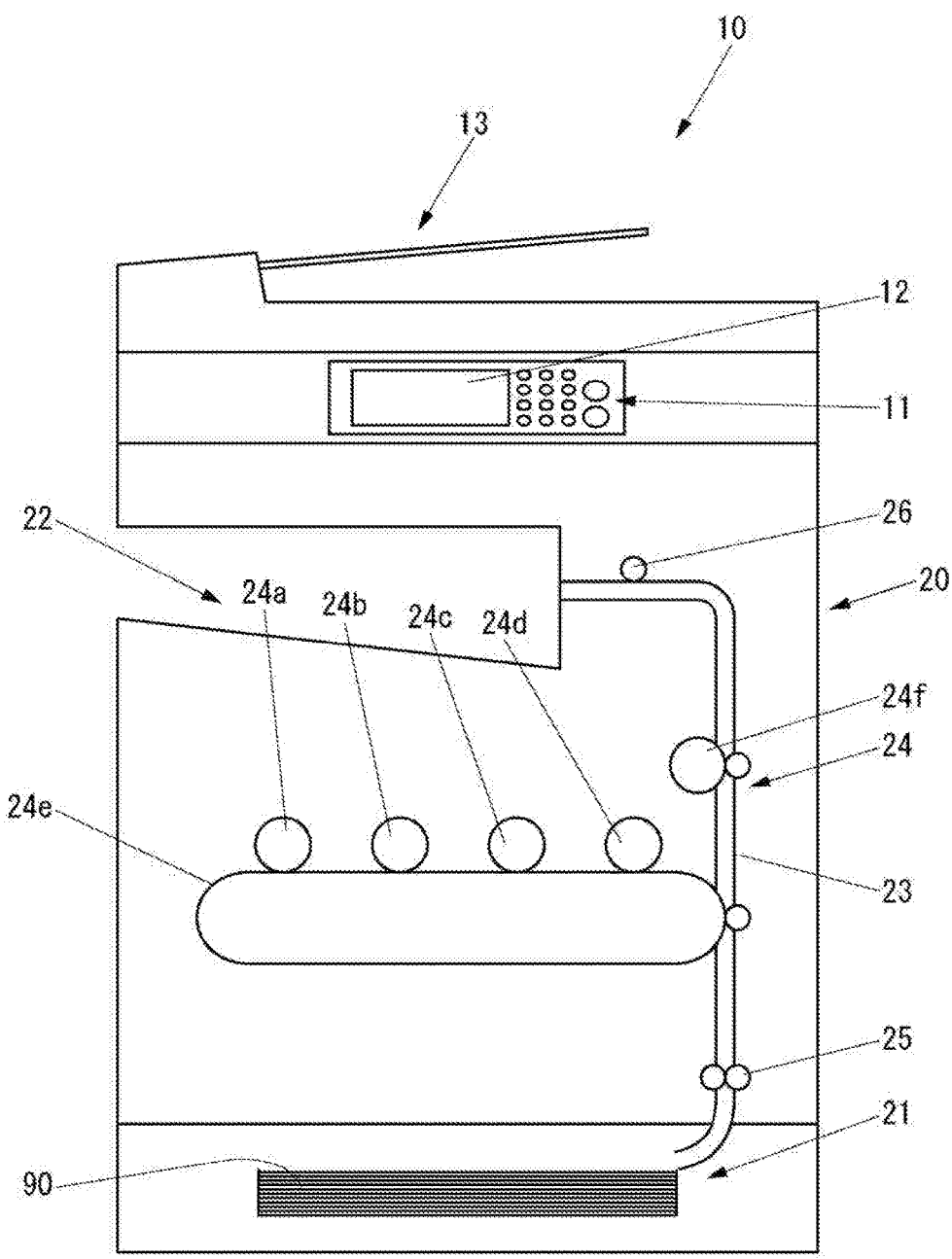
FIG. 2 illustrates a schematic internal configuration of the MFP according to the embodiment.

FIG. 2 illustrates a schematic internal configuration of the MFP 10.

As illustrated in FIG. 2, the printer 20 includes a cassette 21 that feeds a print medium 90, and a medium discharge unit 22 to which the print medium 90 is discharged.

The printer 20 has a conveyance path 23 extending from the cassette 21 to the medium discharge unit 22, along which the print medium 90 is conveyed. The printer 20 includes multiple conveyance rollers on the conveyance path 23 for conveying the print medium 90 along the conveyance path 23.

The printer 20 includes a printing unit 24 that executes a print job on the print medium 90. The printing unit 24 includes photoreceptor drums 24a to 24d for cyan, magenta, yellow, and black, a transfer belt 24e, and a fixing unit 24f. The photoreceptor drums 24a to 24d each form a toner image on the surfaces of the photoreceptor drums. The transfer belt 24e transfers the toner image, which has been formed on the surfaces of the photoreceptor drums 24a to 24d and then transferred on the surface of the transfer belt 24e, to the print medium 90. The fixing unit 24f fixes the toner image, which has been transferred to the print medium 90 from the transfer belt 24e, to the print medium 90.

The printer 20 also includes a registration roller 25 and a discharge sensor 26. The registration roller 25 adjusts timing of conveying the print medium 90 such that the toner image that has been transferred on the surface of the transfer belt 24e can be appropriately transferred on the print medium 90. The discharge sensor 26 detects that the print medium 90 is discharged to the medium discharge unit 22.

The storage unit 16 has an area for storing programs and data. As illustrated in FIG. 1, the storage unit 16 stores an image forming program 16a that controls the MFP 10. The image forming program 16a may be installed on the MFP 10 at production stage of the MFP 10. Alternatively the image forming program 16a may be additionally installed on the MFP 10 from an external storage medium such as an SD card and a universal serial bus (USB) memory, or additionally installed on the MFP 10 from a network location.

The storage unit 16 stores a counter 16b that indicates a print amount. Examples of the counters 16b include counters for color printing for each user, for each group of users, for whole MFP 10, and counters for monochrome printing for each user, for each group of users, for whole MFP 10.

The storage unit 16 may store a print job permission setting 16c that indicates a setting whether or not the permission of print job is determined. The print job permission setting 16c may be set in response to an instruction sent via the operation unit 11 or via the network communication unit 15.

The storage unit 16 stores a permission amount of print job 16d. Examples of the permission amounts 16d include permission amounts for color printing for each user, for each group of users, for whole MFP 10, and permission amounts for monochrome printing for each user, for each group of users, for whole MFP 10. The permission amount 16d may be set in response to an instruction sent via the operation unit 11 or via the network communication unit 15.

The storage unit 16 may store a print amount changing time setting 16e that indicates a setting of time at which a print amount is changed. The print amount changing time setting 16e may be set in response to an instruction sent via the operation unit 11 or via the network communication unit 15. Examples of times that can be set by the print amount changing time setting 16e include a time at which the conveyance rollers of the printer 20 start to convey the print medium 90 from the cassette 21 (hereinafter referred to as "feeding start time"), and a time at which the conveyance rollers of the printer 20 complete to convey the print medium 90 to the medium discharge unit 22 (hereinafter referred to as "discharge complete time"). Note that when the discharge complete time is set, someone may illegally prevent to change a print amount by opening the cover of the MFP 10 to remove the print medium 90 to the outside of the MFP 10 after the printing unit 24 executes a print job on the print medium 90, and before the printed print medium 90 is discharged to the medium discharge unit 22. If the feeding start time is set, such an illegal operation can be prevented.

The control unit 17 includes, for example, a central processing unit (CPU), a read only memory (ROM) that is a non-transitory computer-readable recording medium that stores programs and various kinds of data, and a random access memory (RAM) that is used as a work area of the CPU. The CPU executes the programs stored in the ROM or the storage unit 16.

The control unit 17 executes the image forming program 16a stored in the storage unit 16 so as to operate as: a drawing data generating unit 17a that generates, from print data, drawing data that causes the printing unit 24 to execute a print job (also referred to as drawing data generating circuit); a medium feeding unit 17b that feeds the print medium 90 to the printing unit 24 (also referred to as medium feeding circuit); a print amount controlling unit 17c that controls a print amount (also referred to as print amount controlling circuit); and a print job permitting unit 17d that permits the printing unit 24 to execute a print job (also referred to as print job permitting circuit). The drawing data generating unit 17a, the medium feeding unit 17b, the print amount controlling unit 17c, and the print job permitting unit 17d may have a processing unit such as a central processing unit (CPU) that has one or more circuits, and can load the various programs to execute and also can execute the various programs incorporated inside in advance. Here, the circuits may be an electronic component to which a plurality of electronic elements are connected via wirings, or an electronic substrate to which a plurality of electronic components are connected.

The drawing data generating unit 17a determines colors to be used in a print job executed by the printing unit 24 based on the drawing data when the drawing data generating unit 17a generates the drawing data. In other words, the drawing data generating unit 17a includes a color converting module. For example, the colors to be used in the drawing data generated by the drawing data generating unit 17a based on the print data may be monochrome colors when the colors actually included in an image of the print data are only achromatic colors even if colors specified in the print data are chromatic colors. In other words, the colors to be used that are determined by the drawing data generating unit 17a may be different from the colors specified in the print data. Thus, the print amount controlling unit 17c changes a print amount in response to the colors to be used that are determined by the drawing data generating unit 17a rather than the colors specified in the print data.

Figure 3:
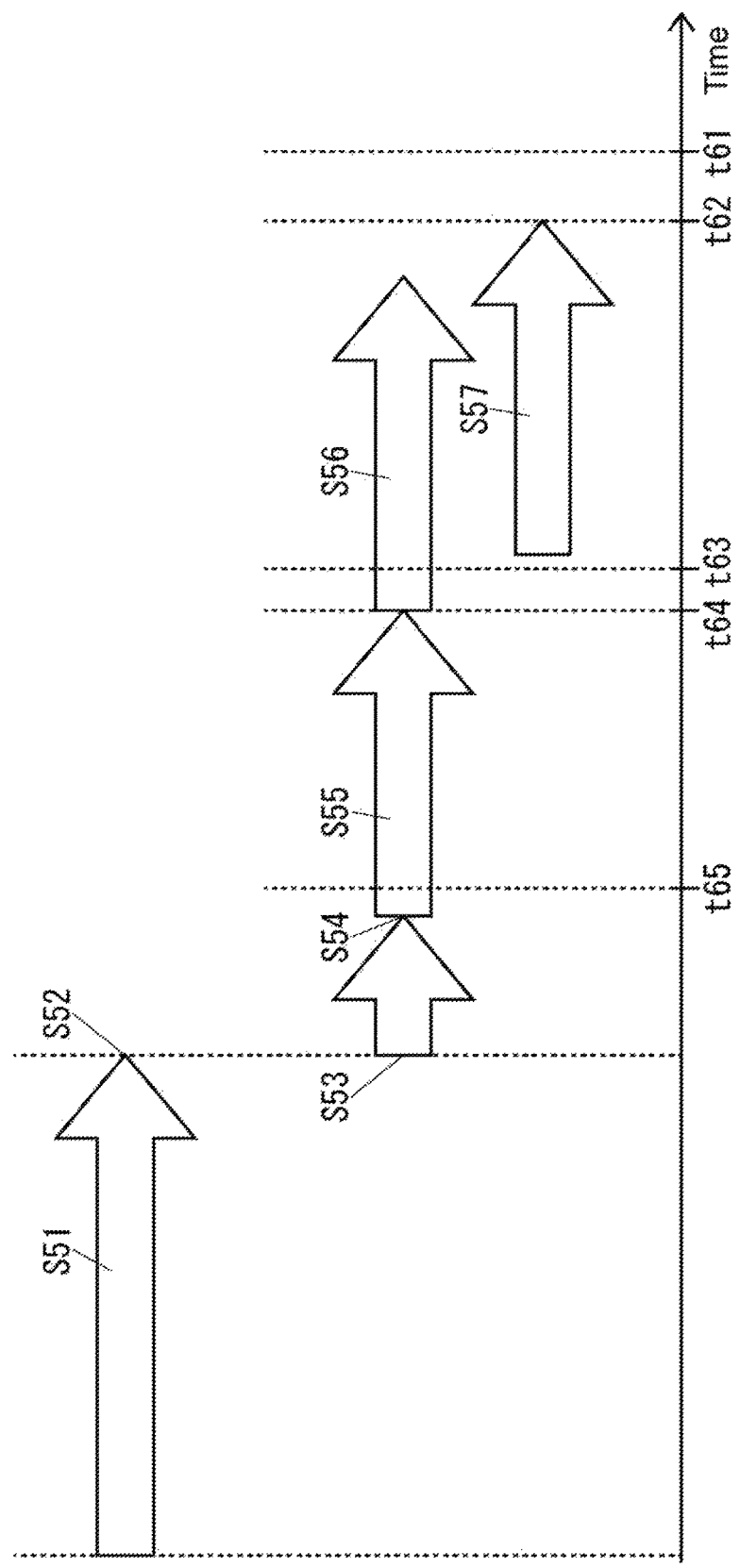
FIG. 3 illustrates exemplary times for various kinds of processes executed by a drawing data generating unit according to the embodiment.

FIG. 3 illustrates exemplary times for various kinds of processes executed by the drawing data generating unit 17a.

As illustrated in FIG. 3, the external device generates the print data (S51), and then starts to transmit the generated print data to the MFP 10 (S52). Thus, the control unit 17 of the MFP 10 starts to receive the print data transmitted from the external device (S53), and then activates a print job that is based on the received print data (S54). Then, when the print job that is activated at S54 is executed, the drawing data generating unit 17a of the control unit 17 generates intermediate image data based on the print data (S55), and rasterizes the intermediate image data generated at S55 (S56). The drawing data generating unit 17a executes a color conversion process on the rasterized image data (S57) to generate the drawing data.

Note that, in the example illustrated in FIG. 3, although the drawing data generating unit 17a starts to generate the drawing data based on the print data that is received from the external device via the network communication unit 15, the drawing data generating unit 17*a* may start to generate the drawing data based on the print data that is input from an external storage medium such as a USB flash drive.

Figure 4:
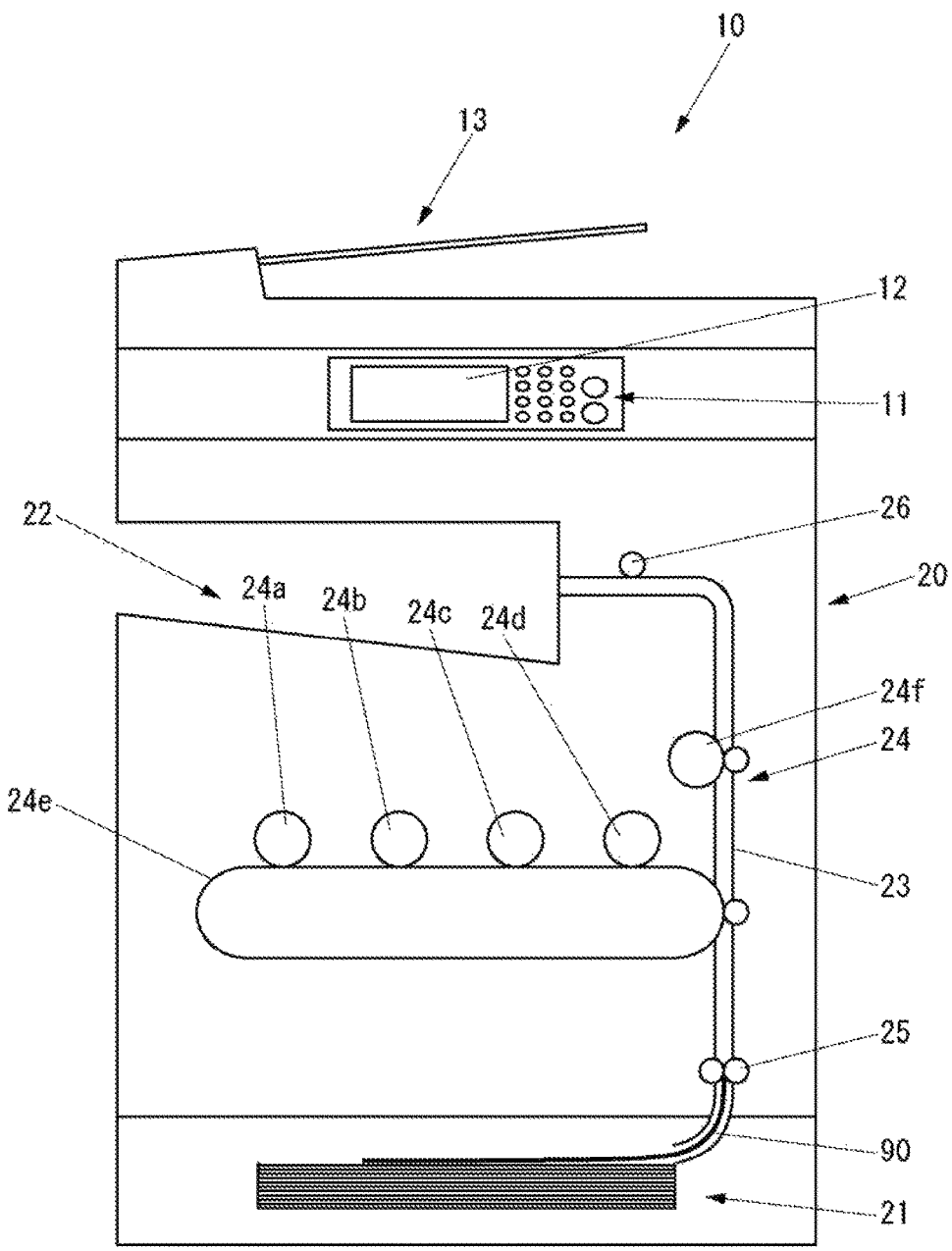
FIG. 4 illustrates a schematic configuration of the MFP at a time when a first feeding stage is completed according to the embodiment.
Figure 5:
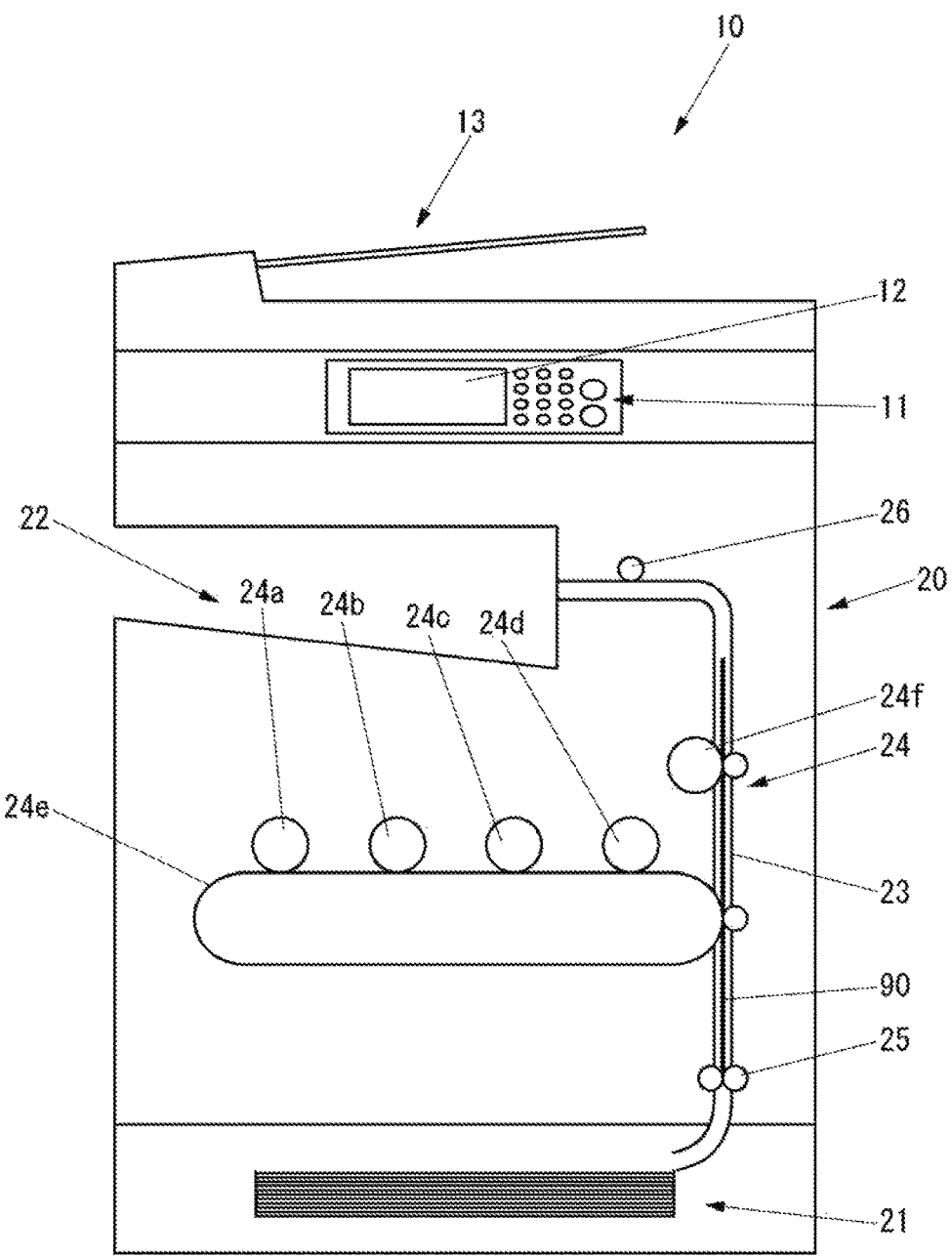
FIG. 5 illustrates a schematic configuration of the MFP during a second feeding stage according to the embodiment.

The medium feeding unit 17*b*, which is illustrated in FIG. 1, executes a first feeding stage in which the print medium 90 moves from the cassette 21 to a specific position, that is, a position of the registration roller 25 as illustrated in FIG. 4, and a second feeding stage in which the print medium 90 moves from the position of the registration roller 25 to the printing unit 24, and then is discharged to the medium discharge unit 22 as illustrated in FIG. 5.

The MFP 10 previously moves the print medium 90 to the position of the registration roller 25 in the first feeding stage, such that the printing unit 24 can execute a print job on the print medium 90 in the second feeding stage immediately after the preparation of printing process, such as the generation of the drawing data by the drawing data generating unit 17*a*, is completed. Consequently, the MFP 10 can enhance printing speed.

In the example illustrated in FIG. 3, the second feeding stage is started, for example, at a time t61. The drawing data generated in the color conversion process of S57 remains compressed at a time t62, at which the color conversion process of S57 is completed. Thus, the control unit 17 needs to carry out preparatory works before the printing unit 24 starts a print job. Examples of preparatory works include decompressing the drawing data generated in the color conversion process of S57, adjusting the positions in the drawing data such that they correspond to margins set in the print data, and rotating the drawing data in a rotation direction set in the print data. The control unit 17 carries out the preparatory works for each region (band), which is obtained by dividing the drawing data into a plurality of regions. The medium feeding unit 17*b* starts the second feeding stage, for example, when the preparatory works of two bands are completed. Thus, the time t61 at which the second feeding stage is started is subsequent to the time t62 at which the color conversion process of S57 is completed. Note that the control unit 17 carries out the preparatory works for the rest of the bands simultaneously with executing the second feeding stage.

In the example illustrated in FIG. 3, the first feeding stage is started, for example, at the time t62 at which the color conversion process of S57 is completed, or at a time t63 that is before the time t62. The time t63 at which the first feeding stage is started may not necessarily be the time illustrated in FIG. 3 as long as it is before the time t62. For example, the time t63 may be a time at which the process of S56 is started. However, the time t63 at which the first feeding stage is started needs to be subsequent to a time t64 at which the process of S55 is completed when the MFP 10 is capable of feeding the print medium 90 from several feeding sources, and the MFP 10 is configured to determine the size of the print medium 90 at S55, and is further configured to determine, based on the determined size, the feeding source with which the first feeding stage is executed.

Note that the control unit 17 starts the preparation including warming the fixing unit 24*f* for the printing unit 24, for example, at a time t65 which is in proximity to a time at which the process of S55 is started. The time t65 may be before the time at which the process of S55 is started, or at the time at which the process of S55 is started, or after the time at which the process of S55 is started.

The print amount controlling unit 17*c*, which is illustrated in FIG. 1, changes print amounts for each user, for each group of users, and for whole MFP 10 indicated by the counters 16*b* at a time set in the print amount changing time setting 16*e* based on the number of images of the drawing data generated by the drawing data generating unit 17*a*, and the colors to be used that are determined by the drawing data generating unit 17*a*.

After the colors to be used are determined by the drawing data generating unit 17*a*, the print job permitting unit 17*d* determines whether or not the sum of a current print amount indicated by the counter 16*b* and a changing amount to be occurred in the print amount by a print job to be executed by the printing unit 24 is equal to or less than the permission amount 16*d* in order to permit the printing unit 24 to execute a print job based on the drawing data. Here, the print job permitting unit 17*d* determines the changing amount to be occurred in the print amount based on the number of images of the drawing data generated by the drawing data generating unit 17*a*, and the colors to be used that are determined by the drawing data generating unit 17*a* when a print job is executed by the printing unit 24 based on the drawing data. When the colors to be used that are determined by the drawing data generating unit 17*a* are chromatic colors, the changing amount is occurred in the print amount indicated by the counter 16*b* for color printing. When the colors to be used that are determined by the drawing data generating unit 17*a* are monochrome colors, the changing amount is occurred in the print amount indicated by the counter 16*b* for monochrome printing. Then, the print job permitting unit 17*d* determines whether or not a value obtained by adding the changing amount to the current print amount is still equal to or less than the permission amount 16*d* for each user and for each group of users based on the current print amount indicated by the counter 16*b* and the permission amount 16*d*. When the value obtained by adding the changing amount to the current print amount is still equal to or less than the permission amount 16*d*, the print job permitting unit 17*d* permits the printing unit 24 to execute a print job based on the drawing data. When the print job permitting unit 17*d* permits the printing unit 24 to execute a print job, the medium feeding unit 17*b* starts the first feeding stage for executing a print job with the printing unit 24.

The following describes the operation of the MFP 10.

Figure 6:
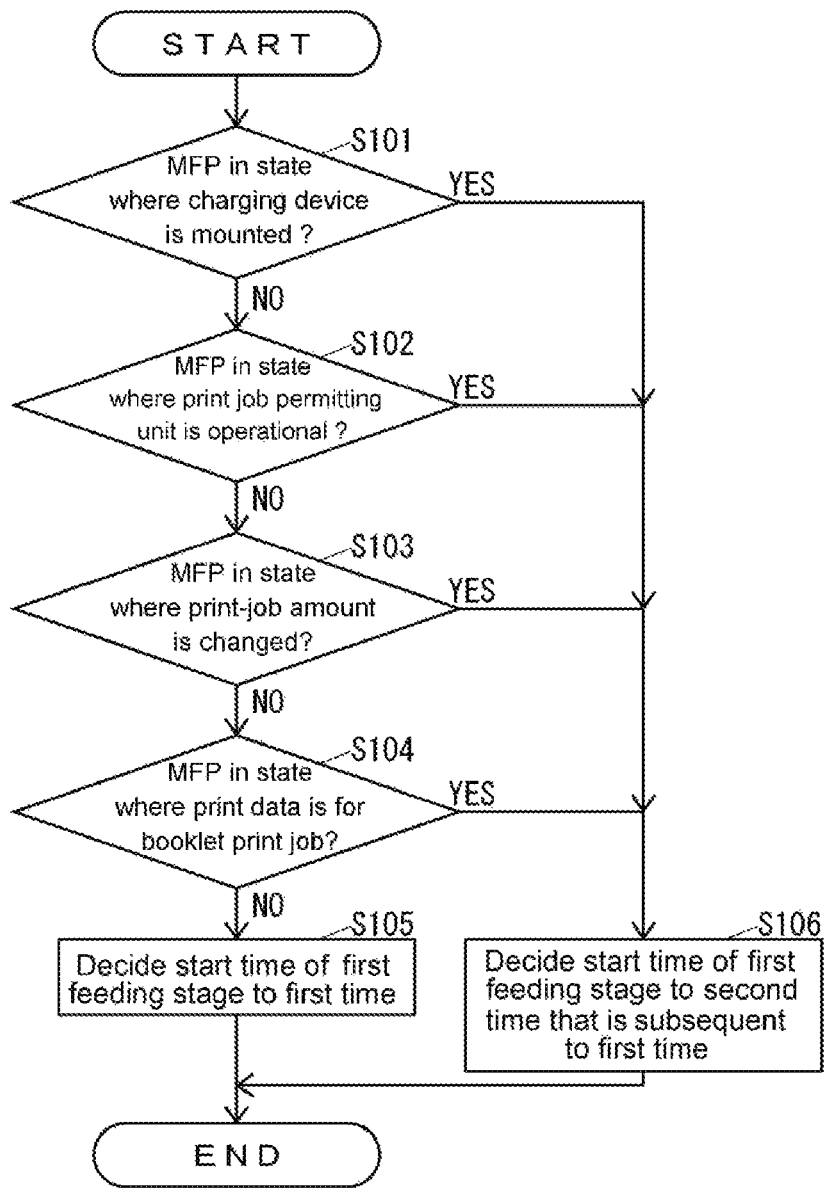
FIG. 6 illustrates the operation of the MFP when determining a start time of the first feeding stage according to the embodiment.

FIG. 6 illustrates the operation of the MFP 10 when determining the start time of the first feeding stage.

As illustrated in FIG. 6, the medium feeding unit 17*b* determines whether or not the MFP 10 is equipped with the charging device 18 (S101).

If the medium feeding unit 17*b* determines that the MFP 10 is not equipped with the charging device 18 at S101, the medium feeding unit 17*b* will determine whether or not the permission of print job is determined by the print job permitting unit 17*d* based on the print job permission setting 16*c* (S102).

If the medium feeding unit 17*b* determines that the permission of print job is not determined by the print job permitting unit 17*d* at S102, the medium feeding unit 17*b* will determine whether or not a time at which a print amount is changed is the feeding start time based on the print amount changing time setting 16*e* (S103).

If the medium feeding unit 17*b* determines that the time at which the print amount is changed is not the feeding start time, in other words, it is the discharge complete time at S103, the medium feeding unit 17*b* will determine whether or not the print data for a processing target is data for a booklet print job (S104).

If the medium feeding unit 17*b* determines that the print data for the processing target is not the data for the booklet print job at S104, the medium feeding unit 17*b* will decide the start time of the first feeding stage to a first time, that is, the time t63 (see FIG. 3) (S105), and will terminate the operation illustrated in FIG. 6.

If the medium feeding unit 17b determines that the MFP 10 is equipped with the charging device 18 at S101, the medium feeding unit 17b will decide the start time of the first feeding stage to a second time that is subsequent to the first time, that is, the time t62 (see FIG. 3) (S106), and will terminate the operation illustrated in FIG. 6.

Note that when the MFP 10 is equipped with the charging device 18, the medium feeding unit 17b determines the amount of money, which is required for a print job to be executed by the printing unit 24 based on the drawing data, based on the number of images of the drawing data generated by the drawing data generating unit 17a, and the colors to be used that are determined by the drawing data generating unit 17a. For example, the amount of money, which is required for color printing for each image, is set higher than the amount of money, which is required for monochrome printing for each image.

If the medium feeding unit 17b determines that the permission of print job is determined by the print job permitting unit 17d, in other words, the print job permitting unit 17d operates at S102, the medium feeding unit 17b will decide the start time of the first feeding stage to the second time that is subsequent to the first time, that is, the time t62 (S106), and will terminate the operation illustrated in FIG. 6.

If the medium feeding unit 17b determines that the time at which the print amount is changed is the feeding start time, in other words, it is set that the print amount is changed by the print amount controlling unit 17c when the first feeding stage is started at S103, the medium feeding unit 17b will decide the start time of the first feeding stage to the second time that is subsequent to the first time, that is, the time t62 (S106), and will terminate the operation illustrated in FIG. 6.

If the medium feeding unit 17b determines that the print data for the processing target is the data for the booklet print job at S104, the medium feeding unit 17b will decide the start time of the first feeding stage to the second time that is subsequent to the first time, that is, the time t62 (S106), and will terminate the operation illustrated in FIG. 6.

As described above, the MFP 10 starts the first feeding stage after the drawing data is generated when the MFP 10 is in a specific state (YES at S101, S102, S103, or S104) (S106), or starts the first feeding stage before the drawing data is generated when the MFP 10 is not in a specific state (NO at S101, S102, S103, and S104) (S105). Thus the MFP 10 can automatically change the start time of feeding the print medium 90 depending on the state of the MFP 10.

Specifically, the MFP 10 can surely execute a charging process with the charging device 18 when the first feeding stage is started for executing a print job with the printing unit 24 since the MFP 10 starts the first feeding stage after the drawing data is generated when the MFP 10 is equipped with the charging device 18 that executes a charging process in response to the colors to be used that are determined by the drawing data generating unit 17a (YES at S101) (S106).

The MFP 10 can surely determine whether or not the printing unit 24 is permitted to execute a print job when the first feeding stage is started for executing a print job with the printing unit 24 since the MFP 10 starts the first feeding stage after the drawing data is generated when the function, which permits the printing unit 24 to execute a print job in response to the print amount that is changed depending on the colors to be used that are determined by the drawing data generating unit 17a, is effective, (YES at S102) (S106).

The MFP 10 can surely change the print amount in response to the colors to be used when the first feeding stage is started since the MFP 10 starts the first feeding stage after the drawing data is generated when it is set that the print amount, which corresponds to the colors to be used in a print job executed by the printing unit 24 based on the drawing data, is changed when the first feeding stage is started (YES at S103) (S106).

The MFP 10 can surely execute the booklet print job in which the last page in the print data needs to be printed on the first print medium 90 since the MFP 10 starts the first feeding stage after the drawing data is generated when the print data is the data for the booklet print job (YES at S104) (S106). Note that similarly to the case where the print data is the data for the booklet print job, the MFP 10 may start the first feeding stage after the drawing data is generated for surely executing a print job when the print data is for a print job that is not executed from the first page to the last page in a sequential order even if the print data is not the data for the booklet print job. Examples of the print data for a print job that is not executed from the first page to the last page in a sequential order include the print data in which printed matters are specified to be discharged with being face up, in other words, the print data in which the last page is first printed.

Note that the MFP 10 may employ states other than the above-described states as specific states in which the first feeding stage is started after the drawing data is generated.

As described above, the MFP 10, for example, decides that the state in which the MFP 10 is equipped with the charging device 18 is a state in which a charging process needs to be executed when the first feeding stage is started. However, the MFP 10 may start the first feeding stage after the drawing data is generated when a charging process needs to be executed when the first feeding stage is started regardless of whether or not the MFP 10 is equipped with the charging device 18. This configuration enable the MFP 10 to surely execute a charging process for a print job executed by the printing unit 24 since a charging process, which corresponds to the colors to be used in a print job executed by the printing unit 24 based on the drawing data, is executed when the first feeding stage is started.

As described above, the MFP 10 decides that the state in which a charging process needs to be executed when the first feeding stage is started, the state in which the print job permitting unit 17d operates, and the state in which it is set that the print amount is changed by the print amount controlling unit 17c when the first feeding stage is started are states in which processes based on the colors to be used that are determined by the drawing data generating unit 17a need to be executed when the first feeding stage is started. However, the MFP 10 may start the first feeding stage after the drawing data is generated when the processes based on the colors to be used that are determined by the drawing data generating unit 17a need to be executed when the first feeding stage is started regardless of whether or not the MFP 10 is in the state in which a charging process needs to be executed when the first feeding stage is started, regardless of whether or not the MFP 10 is in the state in which the print job permitting unit 17d operates, and regardless of whether or not the MFP 10 is in the state in which it is set that the print amount is changed by the print amount controlling unit 17c when the first feeding stage is started. This configuration enable the MFP 10 to surely execute the processes based on the colors to be used when the first feeding stage is started since the MFP 10 starts the first feeding stage after the drawing data is generated when the processes, which are based on the colors to be used in a print job executed by the printing unit 24 based on the drawing data rather than based on the colors specified in the print data, need to be executed when the first feeding stage is started.

Note that the image forming program 16*a* may not execute the operation illustrated in FIG. 6 but cause the image forming apparatus itself to operate so as to start to feed the print medium 90 from the cassette 21 to the printing unit 24 at the time t62 when the model of the image forming apparatus on which the image forming program 16*a* itself is installed is a model of an image forming apparatus that does not include the registration roller 25. In this configuration, the image forming program 16*a* may be used in both of an image forming apparatus that includes the registration roller 25 and an image forming apparatus that does not include the registration roller 25. This enhances the versatility of the image forming program 16*a*.

Although the image forming apparatus according to the disclosure is an MFP in the embodiment, the image forming apparatus may be an image forming apparatus other than the MFP, such as a printer-only machine, as long as the image forming apparatus executes a print job based on the print data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
    a printer that executes a print job on a print medium;
    a drawing data generating circuit that generates, from print data, drawing data that causes the printer to execute a print job; and
    a medium feeding circuit that feeds the print medium to the printer; wherein
    the medium feeding circuit executes
        a first feeding stage in which the print medium moves to a specific position, and
        a second feeding stage in which the print medium moves from the specific position to the printer, and
    the medium feeding circuit starts the first feeding stage after the drawing data is generated by the drawing data generating circuit when the image forming apparatus is in any one of specified states, and starts the first feeding stage before the drawing data is generated by the drawing data generating circuit when the image forming apparatus is not in any one of the specified states;
    the drawing data generating circuit determines colors to be used in a print job executed by the printer based on the drawing data when the drawing data generating circuit generates the drawing data;
    the drawing data generating circuit determines colors that are different from colors specified in the print data as the colors to be used;
    at least one of the specified states is a state in which a charging process corresponding to the colors to be used that are determined by the drawing data generating circuit needs to be executed when the first feeding stage is started; and
    the charging process includes a process of determining the amount of money required for printing, based on the drawing data.

2. The image forming apparatus according to claim 1, wherein the medium feeding circuit determines that the image forming apparatus is in a state, among said specified states, in which the charging process needs to be executed when the first feeding stage is started when the image forming apparatus is equipped with a charging device that executes the charging process.

3. The image forming apparatus according to claim 1, further comprising:
    a print amount controlling circuit that controls a print amount; and
    a print job permitting circuit that permits the printer to execute a print job; wherein
    the print amount controlling circuit changes the print amount in response to the colors to be used that are determined by the drawing data generating circuit,
    the print job permitting circuit permits the printer to execute a print job when a sum of the print amount that is controlled by the print amount controlling circuit and a changing amount to be occurred in the print amount by a print job to be executed by the printer is equal to or less than a permission amount,
    the medium feeding circuit starts the first feeding stage when the print job permitting circuit permits the printer to execute a print job when the print job permitting circuit operates, and
    at least one of the specified states is a state in which the print job permitting circuit operates.

4. The image forming apparatus according to claim 1, further comprising a print amount controlling circuit that controls a print amount; wherein:
    the print amount controlling circuit changes the print amount in response to the colors to be used that are determined by the drawing data generating circuit; and
    at least one of the specified states is a state in which the print amount is set to be changed by the print amount controlling circuit when the first feeding stage is started.

5. The image forming apparatus according to claim 1, wherein at least one of the specified states is a state in which the print data is data for a booklet print job.

6. A non-transitory computer-readable recording medium storing an image forming program to control an image forming apparatus, the image forming program causing the image forming apparatus to operate as:
    a printer that executes a print job on a print medium;
    a drawing data generating circuit that generates, from print data, drawing data that causes the printer to execute a print job; and
    a medium feeding circuit that feeds the print medium to the printer; wherein
    the medium feeding circuit executes
        a first feeding stage in which the print medium moves to a specific position, and
        a second feeding stage in which the print medium moves from the specific position to the printer, and
    the medium feeding circuit starts the first feeding stage after the drawing data is generated by the drawing data generating circuit when the image forming apparatus is in any one of specified states, and starts the first feeding stage before the drawing data is generated by the drawing data generating circuit when the image forming apparatus is not in any one of the specified states;
    the drawing data generating circuit determines colors to be used in a print job executed by the printer based on the drawing data when the drawing data generating circuit generates the drawing data;

the drawing data generating circuit determines colors that are different from colors specified in the print data as the colors to be used;

at least one of the specified states is a state in which a charging process corresponding to the colors to be used that are determined by the drawing data generating circuit needs to be executed when the first feeding stage is started; and the charging process includes a process of determining the amount of money required for printing, based on the drawing data.

* * * * *